(12) United States Patent
Kajikawa

(10) Patent No.: US 8,779,327 B2
(45) Date of Patent: Jul. 15, 2014

(54) LASER SCRIBE PROCESSING METHOD

(75) Inventor: Toshikazu Kajikawa, Kobe (JP)

(73) Assignee: Seishin Trading Co., Ltd., Hyogo (JP)

( * ) Notice: Subject to any disclaimer, the term of this patent is extended or adjusted under 35 U.S.C. 154(b) by 221 days.

(21) Appl. No.: 13/261,033

(22) PCT Filed: Jun. 10, 2010

(86) PCT No.: PCT/JP2010/059868
§ 371 (c)(1),
(2), (4) Date: Dec. 22, 2011

(87) PCT Pub. No.: WO2011/013449
PCT Pub. Date: Feb. 3, 2011

(65) Prior Publication Data
US 2012/0261453 A1    Oct. 18, 2012

(30) Foreign Application Priority Data
Jul. 29, 2009 (JP) ................................. 2009-176462

(51) Int. Cl.
*B23K 26/00* (2014.01)
*B23K 26/40* (2014.01)
*B23K 26/067* (2006.01)
*C03B 33/09* (2006.01)
*B23K 26/36* (2014.01)
*B23K 26/06* (2014.01)

(52) U.S. Cl.
CPC ........... *C03B 33/093* (2013.01); *B23K 26/4075* (2013.01); *B23K 26/0676* (2013.01); *B23K 26/367* (2013.01); *B23K 26/0652* (2013.01)
USPC .................................................. 219/121.69

(58) Field of Classification Search
USPC ........................................ 219/121.69, 121.67
See application file for complete search history.

(56) References Cited

U.S. PATENT DOCUMENTS 7,212,294 B2 * 5/2007 Stroel .......................... 356/622
8,049,134 B2 * 11/2011 Nomaru et al. .......... 219/121.68
(Continued)

FOREIGN PATENT DOCUMENTS

CN    1925945    3/2007
JP    7-294739   11/1995
(Continued)

OTHER PUBLICATIONS

Microfilm of the specification and drawings annexed to the request of Japanese Utility Model Application No. 023536/1973 (Laid-open No. 126694/1974) (Tokyo Shibaura Electric Co., Ltd.), Oct. 30, 1974, specification, p. 2, line 9 to p. 3, line 10; all drawings (Family: none).

*Primary Examiner* — Dana Ross
*Assistant Examiner* — Renee L Miller
(74) *Attorney, Agent, or Firm* — Jordan and Hamburg LLP

(57) ABSTRACT

A laser scribe processing method of forming a crack that runs along a scribe direction of a processing target substance uses a light source that emits a laser beam, and an optical system for irradiation that leads the laser beam onto the processing target substance, the method including: an emission step of emitting a laser beam from the light source; a splitting step of splitting the laser beam into an ordinary light component and an extraordinary light component having different travel directions; a light converging step of converging the ordinary light component and the extraordinary light component to form multiple pairs of beam spots; and an irradiation step of intermittently irradiating with the laser beam having multiple pairs of beam spots in a scribe direction of the processing target substance. For splitting the ordinary light component and the extraordinary light component in the splitting step, a birefringent prism disposed in the optical system for irradiation may be used.

11 Claims, 14 Drawing Sheets

(56) References Cited

U.S. PATENT DOCUMENTS

| | | |
|---|---|---|
| 2006/0086704 A1 | 4/2006 | Nagai |
| 2009/0004828 A1 | 1/2009 | Kobayashi |

FOREIGN PATENT DOCUMENTS

| | | |
|---|---|---|
| JP | 9-231601 | 9/1997 |
| JP | 2000-176669 | 6/2000 |
| JP | 2001-130921 | 5/2001 |
| JP | 2007-000931 | 1/2007 |
| JP | 2007-118009 | 5/2007 |
| JP | 2007-118054 | 5/2007 |
| JP | 2007-260749 | 10/2007 |
| JP | 2007-289980 | 11/2007 |
| JP | 2008-093706 | 4/2008 |
| JP | 2009-010105 | 1/2009 |
| JP | 2009-131876 | 6/2009 |

* cited by examiner ly, provided is a method in which: an emitted laser beam is split into an ordinary light component and an extraordinary light component, which are allowed to travel toward each different directions, followed by light converging; thus formed multiple pairs of beam spots are simultaneously irradiated onto a processing target substance; and the processing target substance is cut using cracks formed between the multiple pairs of beam spots. Accordingly, by concomitantly forming multiple pairs of beam spots spaced with one another on a processing target substance, cracks having directionality but having fewer heat affected layers can be effectively formed and extended. As a result, uniform and symmetrical cutting of the processing target substance can be realized. In addition, by intermittently irradiating the processing target substance in a scribe direction thereof with the laser beam thus having multiple pairs of beam spots, cracks that extend on a straight line that connects between the multiple pairs of beam spots are linked, whereby the processing target substance can be cut uniformly and symmetrically while minimizing the influences from thermal stress.

For splitting into an ordinary light component and an extraordinary light component in the splitting step, a birefrin-

LASER SCRIBE PROCESSING METHOD

BACKGROUND OF THE INVENTION

The present invention relates to a laser scribe processing method for use in processing hard and brittle materials and the like.

BACKGROUND ART

As a means for cutting circuit boards and the like equipped with electronic parts, laser processing has been widely used. In laser processing, a laser beam emitted from a light source is converged using an optical system for irradiation such as a lens, and a laser converged spot (beam waist) having an elevated power density is irradiated onto a board to cut the board.

As a material entity of the board, a hard and brittle material has been used. Hard and brittle materials are classified into noncrystalline hard and brittle materials typified by glass materials, and crystalline hard and brittle materials typified by sapphire and the like. For example, when a laser beam is, irradiated onto a board formed from a noncrystalline hard and brittle material, concomitant with formation of melt processing marks and thermally altered portions on a part of the board as a result of the thermal processing, irregular cracks are formed that result from strain stress generated concurrently with thermal processing. Such cracks are formed in various directions on the surface of the board, and the direction of this formation has been known to be affected by asymmetry, wavefront aberration and the like of the optical system for irradiation or the laser beam. In addition, crystalline materials have orientations along which cleavage is likely to occur (cleavage plane). When a board configured from such a crystalline material is subjected to laser processing, cracks are generally formed along a cleavage planar direction of the crystalline material that configures the board. Accordingly, cracks formed in various directions on the surface and the interior of a board by laser processing are believed to make it possible to cut the board nonuniformly (asymmetrically), and to cut in a desired cutting direction difficult.

With regard to such generation of cracks, as a means for preventing generation of cracks, JP-A No. 2008-93706 discloses (A) a laser processing method in which a processing is carried out while relatively shifting a laser beam with respect to an object to be processed, and the method is characterized in that the laser beam has an elliptical beam shape having a long axis along a relative shifting direction on an irradiated face of the object to be processed, and that light intensity distribution along the long axis direction is asymmetric. In addition, as a means for cutting a board utilizing generation of cracks, JP-A No. 2007-260749 discloses (B) a laser processing method in which first laser light is converged to the vicinity of the surface of the object to be processed to form an initial crack, and the cut crack is developed on the object to be processed from the initial crack as a starting point, whereby cutting of the object to be processed is executed.

However, according to the laser processing method (A) described above, a special light converging optical system is needed for preventing generation of cracks. In addition, according to the laser processing method (B), cutting is executed using thermal stress generated by irradiating with a laser beam onto a hard and brittle material of the board; however, problems of causing deformation of the board and occurrence of nonuniform torn surface may be raised when such thermal stress is great. Moreover, since it is necessary to provide a cooling step in which a cooling medium is sprayed on the region irradiated with laser, problems in terms of preparation and production may be involved.

PRIOR ART DOCUMENTS

Patent Documents

Patent Document 1: JP-A No. 2007-260749
Patent Document 2: JP-A No. 2008-93706

SUMMARY OF THE INVENTION

The present invention was made in view of the foregoing problems, and an object of the invention is to provide a laser scribe processing method in which multiple pairs of beam spots are formed on the surface of a board concurrently with irradiation with a laser beam in laser scribe processing of a board formed from a hard and brittle material such as glass or sapphire, and in which the direction of cutting the board can be adjusted to agree with a desired direction by controlling the direction of extension of cracks formed with the multiple pairs of beam spots.

An aspect of the invention made for the purpose of solving the foregoing problems is a laser scribe processing method of forming cracks that run along a scribe direction of a processing target substance using a light source that emits a laser beam, and an optical system for irradiation that leads the laser beam onto a processing target substance, the method including:

an emission step of emitting a laser beam from the light source;

a splitting step of splitting the laser beam into an ordinary light component and an extraordinary light component having different travel directions;

a light converging step of converging the ordinary light component and the extraordinary light component to form multiple pairs of beam spots; and an irradiation step of intermittently irradiating with the laser beam having multiple pairs of beam spots in a scribe direction of the processing target substance.

The laser processing method is a laser scribe processing method in which a crack along a scribe direction of a processing target substance is formed using a light source that emits a laser beam, and an optical system for irradiation that leads the laser beam onto a processing target substance. Specifica gent prism disposed in the optical system for irradiation may be used. By using such a birefringent prism, splitting of the laser beam into the ordinary light component and the extraordinary light component can be realized concomitantly with travelling of thus split ordinary light component and extraordinary light component toward different directions. As a result, simplification and improvement of operability of the device configuration can be achieved.

The directions of splitting of the ordinary light component and the extraordinary light component may be adjusted such that the directions of splitting of a pair of beam spots in the irradiation step run along the scribe direction of the processing target substance. When the directions of splitting of the ordinary light component and the extraordinary light component are adjusted in this manner, directions of splitting of the a pair of beam spots spaced apart can be adjusted so as to meet the scribe direction of the processing target substance. Therefore, cracks can be effectively extended with respect to the scribe direction; and the extension direction of the cracks can be controlled, whereby crack formation along the desired direction is enabled. As a result, breakage of the processing target substance can be executed uniformly and symmetrically.

The directions of splitting of the ordinary light component and the extraordinary light component may be adjusted such that the directions of splitting of a pair of beam spots in the irradiation step run along the cleavage plane of the processing target substance. For example, when the processing target substance is formed from a hard and brittle material such as sapphire, the directions of splitting of the ordinary light component and the extraordinary light component are adjusted to adjust the directions of splitting of the a pair of beam spots spaced apart so as to run along the cleavage plane of the processing target substance. Thus, the cracks can be extended along the cleavage plane, and uniform and symmetrical cutting with respect to the desired direction can be realized using the extension of the cracks.

For adjusting the directions of splitting of a pair of beam spots in the irradiation step, a birefringent prism which is disposed in the optical system for irradiation, and is rotatable around the optical axis of the optical system for irradiation may be used. Adapting such a birefringent prism rotatable around the optical axis of the optical system for irradiation enables: (1) the laser beam to be split into the ordinary light component and the extraordinary light component; (2) the ordinary light component and extraordinary light components to concomitantly travel toward the different directions; and further (3) the directions of splitting of the ordinary light component and the extraordinary light component to be easily adjusted also in the face perpendicular to the optical axis of the optical system for irradiation.

The directions of splitting of the ordinary light component and the extraordinary light component may be adjusted such that the distance between centers of the a pair of beam spots in the irradiation step is adjusted. Adjusting the directions of splitting of the ordinary light component and the extraordinary light component of the split laser beam enables the distance between centers of the a pair of beam spots to be adjusted to meet the adjustment. By thus adjusting to give an optimal value of the distance between centers of the a pair of beam spots depending on the type and properties as well as the processing characteristics and the like of the processing target substance, formation and extension of the crack on the straight line that connects between the a pair of beam spots can be effectively realized, and the formation and extension of the crack can be easily controlled.

The distance between centers of the a pair of beam spots in the irradiation step is preferably adjusted to 0.2 times or greater and 50 times or less of the diameter of the spot (may be also referred to as "spot diameter"). When the distance between centers of the a pair of beam spots falls within this range, the formation and extension of the crack on the straight line that connects between a pair of beam spots can be most effectively realized. As a result, a straight and stable crack can be formed and extended along the scribe direction of the processing target substance, and cutting of the processing target substance can be executed even more uniformly and symmetrically.

In the splitting step, a half-wave plate which is disposed in the optical system for irradiation and is rotatable around the optical axis of the optical system for irradiation may be used to adjust the intensity ratio of the ordinary light component to the extraordinary light component. Adjusting the intensity ratio of the ordinary light component to the extraordinary light component using a polarization rotation element such as this half-wave plate enables the power density of the multiple pairs of beam spots to be controlled, and the extension direction of the crack formed with the multiple pairs of beam spots to be adjusted. As a result, generation of a thermal effect layer which is most appropriate for the type and properties as well as the processing characteristics of the processing target substance, and the cutting direction of the processing target substance can be easily adjusted.

The spot diameter of multiple pairs of beam spots formed in the irradiation step is preferably 0.3 µm or greater and 300 µm or less. When the spot diameter falls within this range, cracks formed on the a straight line that connects multiple pairs of beam spots can be even more greatly extended, and thus uniform and symmetrical cutting of the processing target substance can be easily realized while minimizing the influences of thermal stress.

The optical system for irradiation may further have a quarter-wave plate. When the quarter-wave plate is provided, linear polarization of the laser beam is converted into circular polarization, and thus influences of polarization are eliminated, whereby stabilization of processing characteristics can be easily ensured.

The term "scribe direction" as referred to herein means a direction of the laser beam intermittently irradiated onto a processing target substance. The term "cutting direction" means a direction of breakage generated on the processing target substance. The term "directions of splitting of a pair of beam spots" means directions of splitting of a pair of beam spots formed from an ordinary light component and an extraordinary light component, and also directions of splitting in a face that is perpendicular to the optical axis of the optical system for irradiation. The term "distance between centers of the a pair of beam spots" means the distance between substantially circular center points each formed by a pair of beam spots formed from the ordinary light component and the extraordinary light component in a face that is perpendicular to the optical axis of the optical system for irradiation. The term "optical axis of the optical system for irradiation" means the optical axis of a portion of the irradiation target substance to be the object of contrast of this optical axis.

As described in the foregoing, uniform and symmetrical cutting of the processing target substance can be effectively and easily executed according to the laser scribe processing method of the present invention by irradiating with a laser beam to concomitantly form multiple pairs of beam spots on the processing target substance, and by controlling cracks formed with the multiple pairs of beam spots so as to extend in a direction along which the processing target substance is likely to be broken. Moreover, the laser scribe processing method of the present invention includes convenient and simple steps, and thus enables formation and control of the extension direction of cracks to be easily carried out. Therefore, improvement of operation efficiency can be achieved.

DESCRIPTION OF THE PREFERRED EMBODIMENTS

Hereinafter, preferred modes for carrying out the present invention are explained in detail with appropriate references to drawings.

Figure 1:
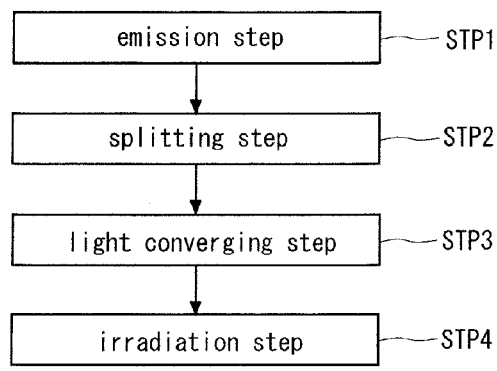
FIG. 1 shows a flow diagram illustrating a laser processing method according to one embodiment of the present invention.

In the laser scribe processing method shown in FIG. 1, a target substance Q of processing (board) formed from a hard and brittle material or the like is irradiated with a laser beam P, thereby forming cracks along the scribe direction of the target substance Q of processing to execute the processing. The laser scribe processing method has an emission step STP1, a splitting step STP2, a light converging step STP3 and an irradiation step STP4.

Figure 2:
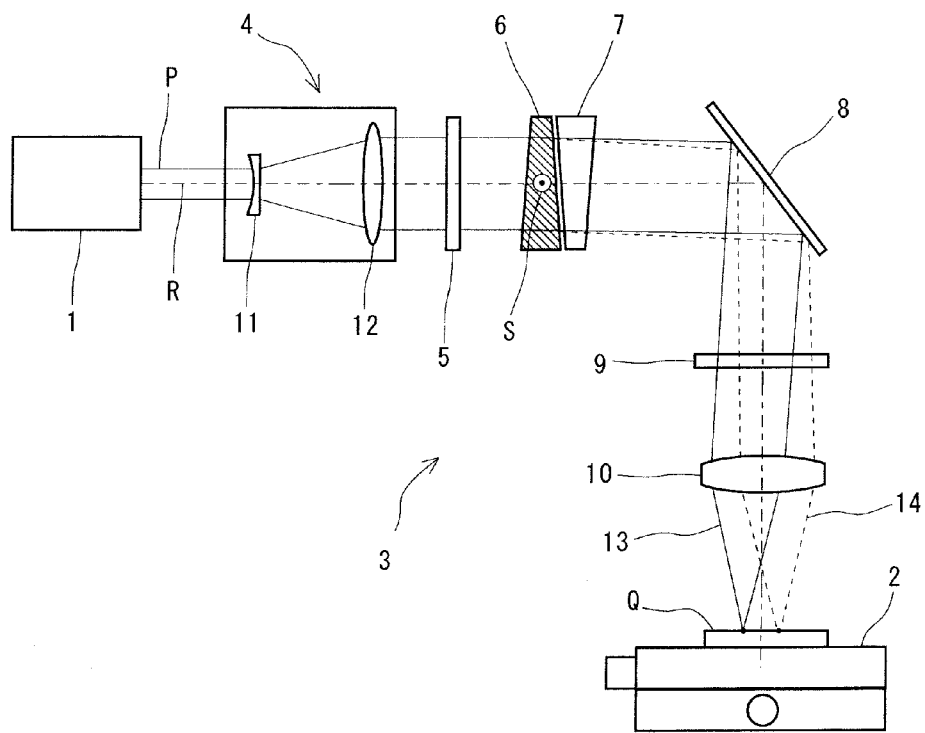
FIG. 2 shows a schematic configuration diagram illustrating an example of system configuration (may be also referred to as "system configuration example") of the laser processing method shown in FIG. 1.
Figure 3:
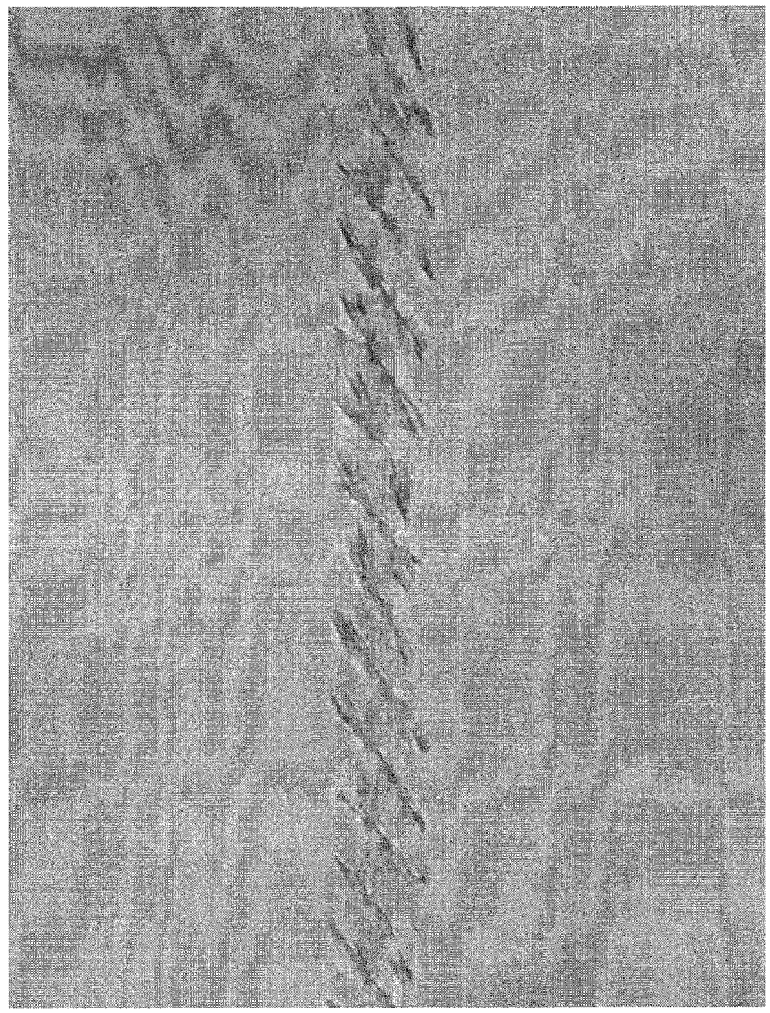
FIG. 3 shows an observed image view illustrating cracks formed in Example 1.
Figure 4:
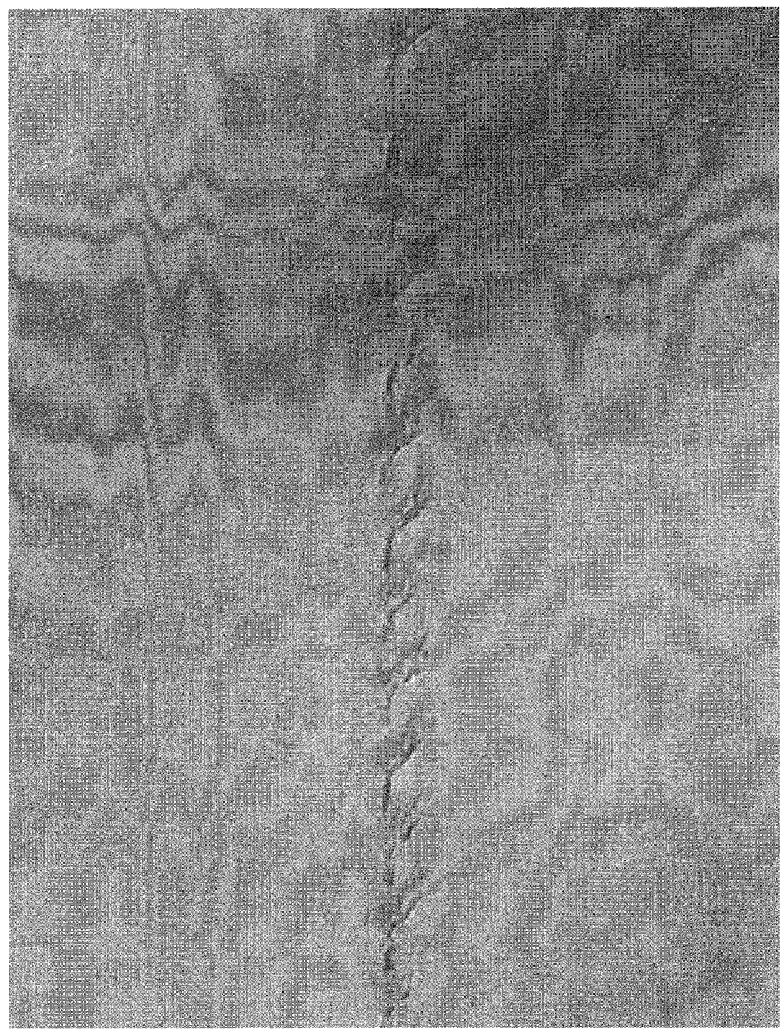
FIG. 4 shows an observed image view illustrating cracks formed in Example 2.
Figure 5:
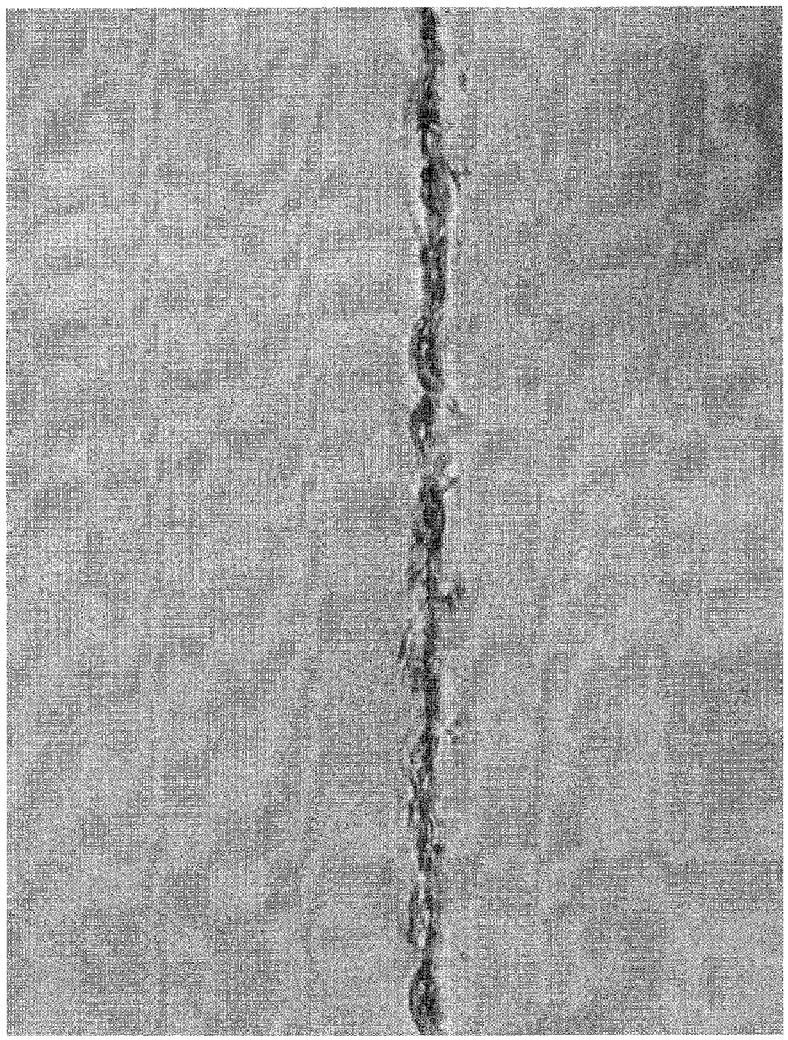
FIG. 5 shows an observed image view illustrating cracks formed in Example 3.
Figure 6:
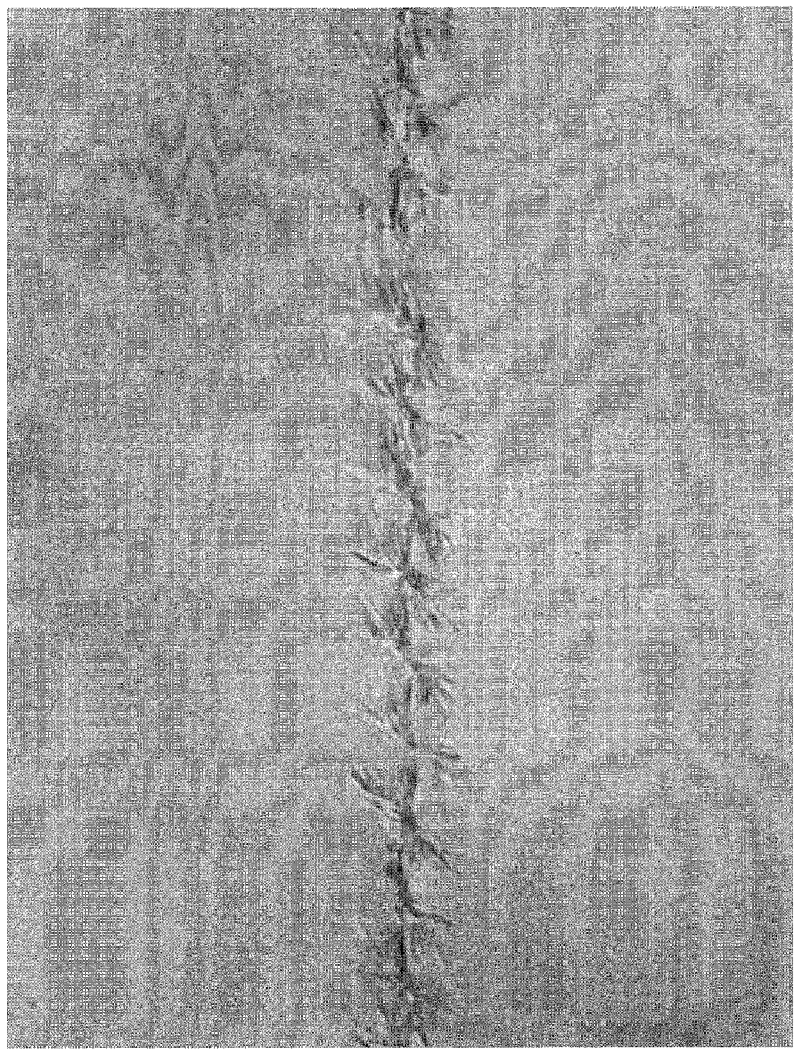
FIG. 6 shows an observed image view illustrating cracks formed in Comparative Example 1.
Figure 7:
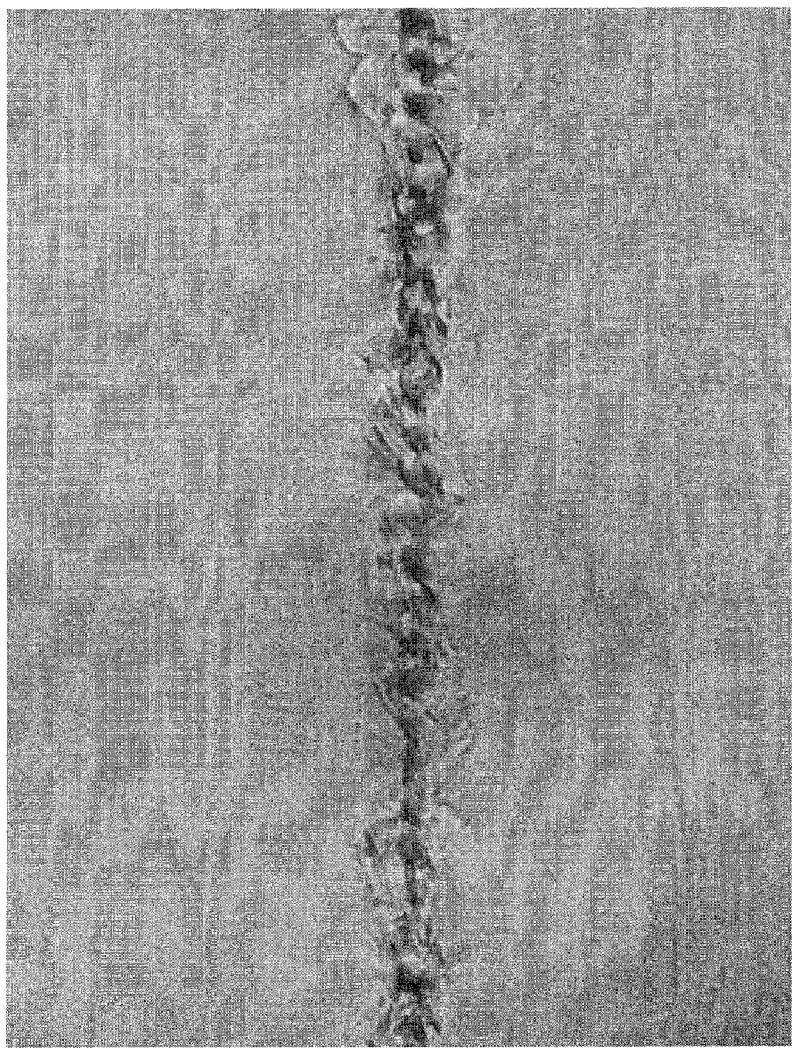
FIG. 7 shows an observed image view illustrating cracks formed in Comparative Example 2.
Figure 8:
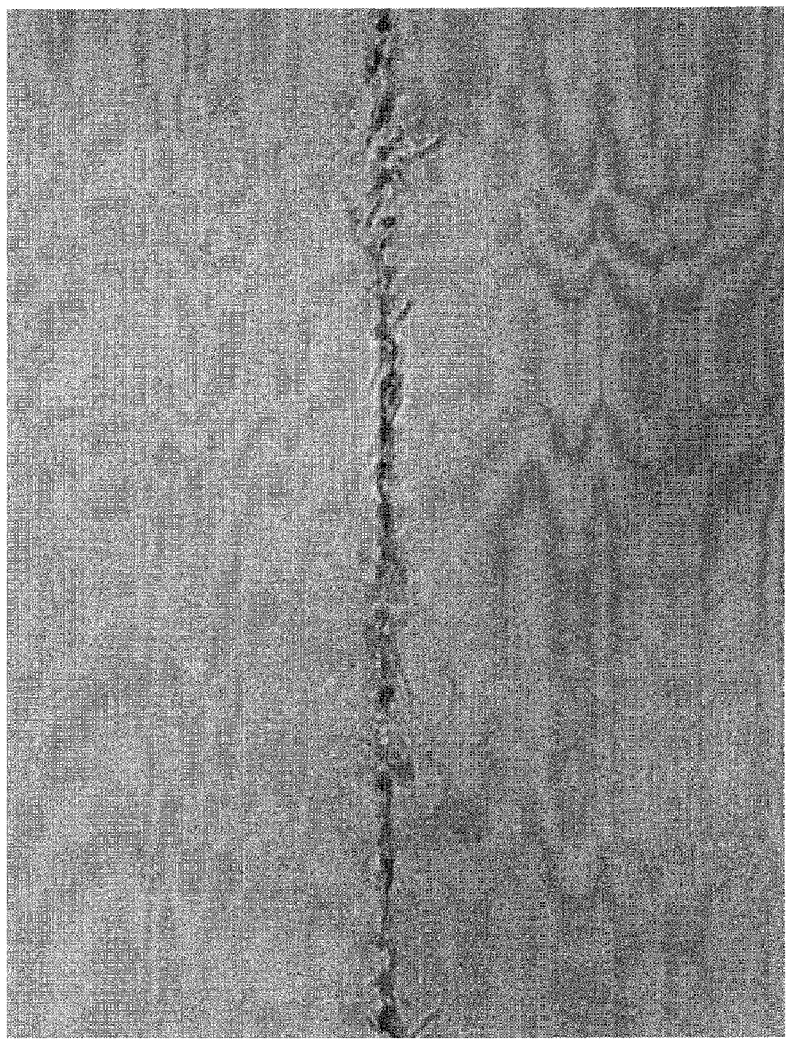
FIG. 8 shows an observed image view illustrating cracks formed in Comparative. Example 3.
Figure 9:
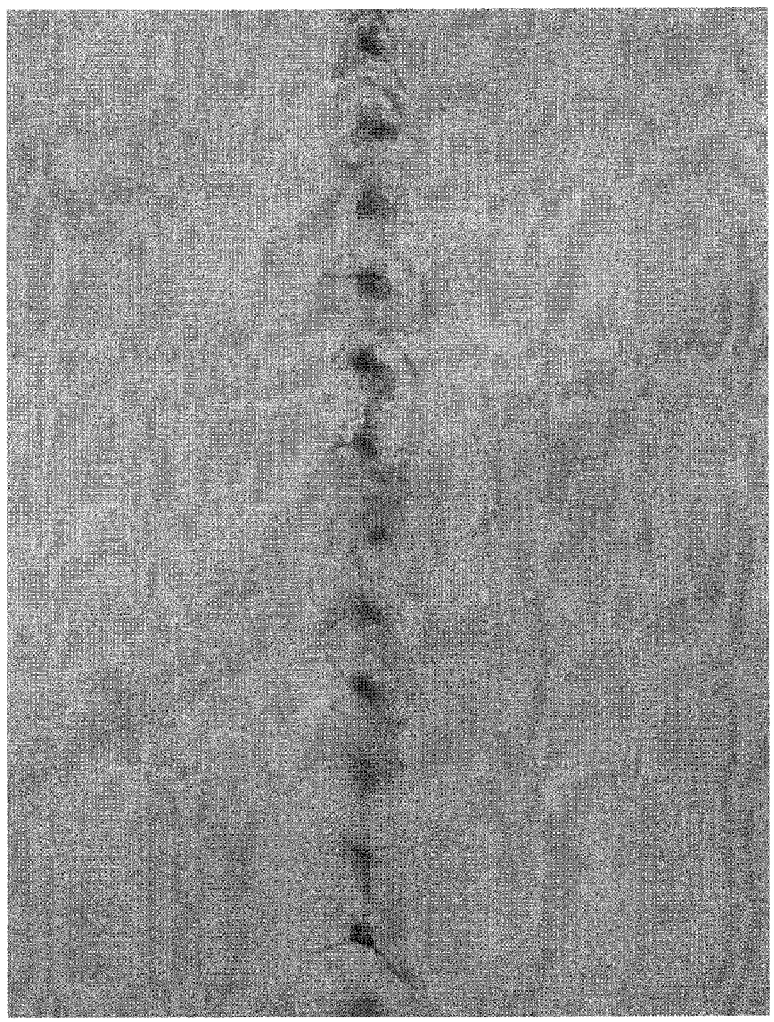
FIG. 9 shows an observed image view illustrating cracks formed in Comparative Example 4.
Figure 10:
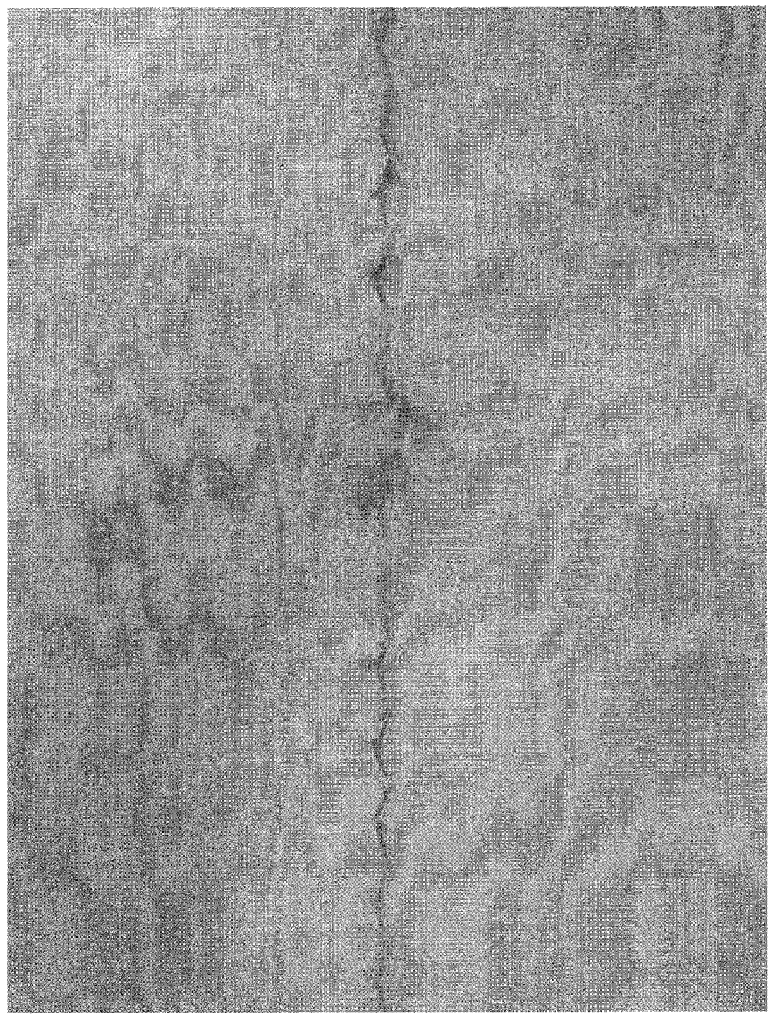
FIG. 10 shows an observed image view illustrating cracks formed in Example 4.
Figure 11:
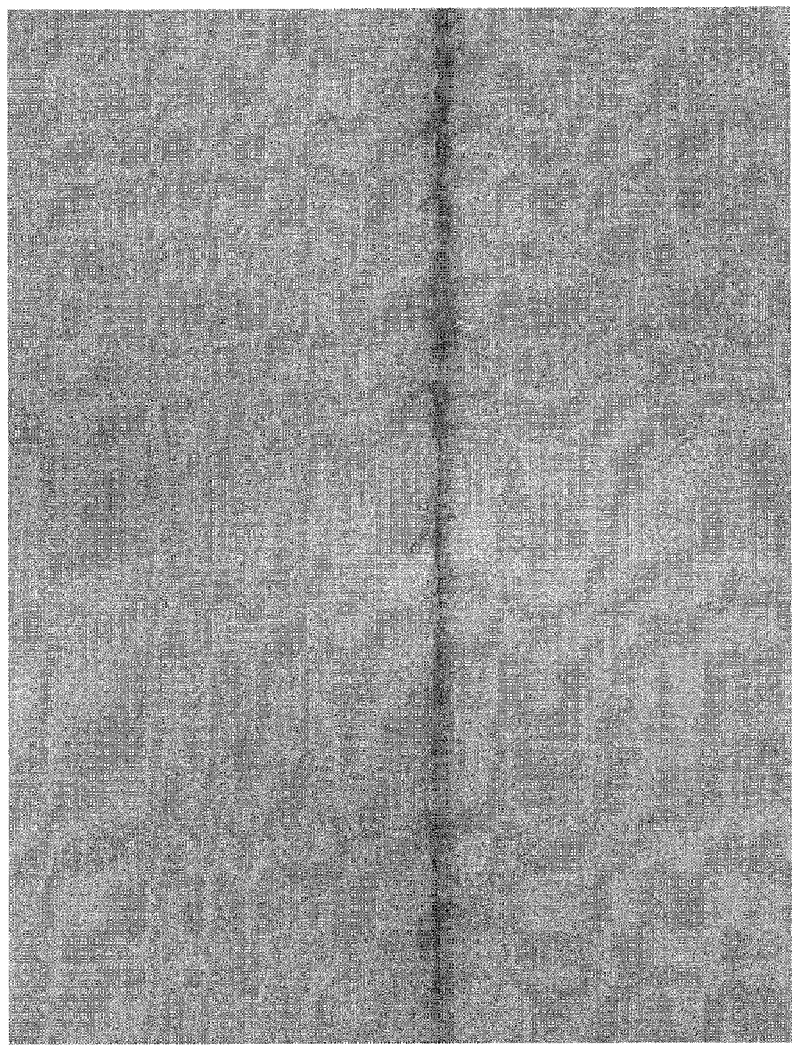
FIG. 11 shows an observed image view illustrating cracks formed in Example 5.
Figure 12:
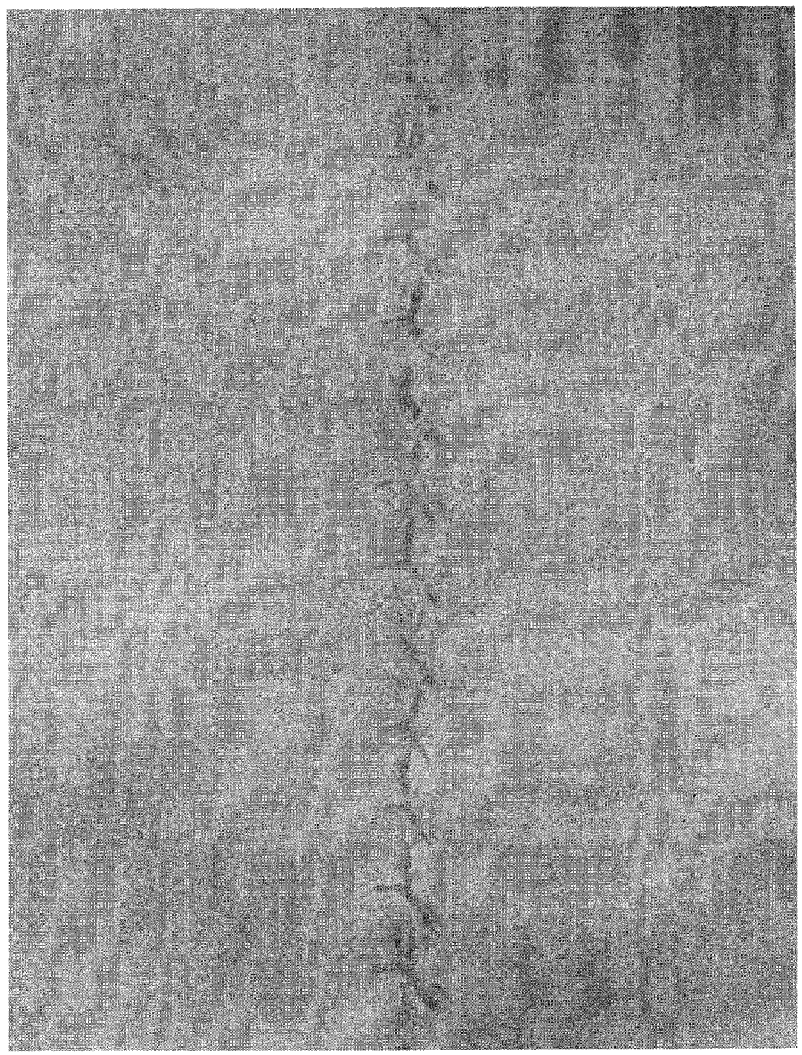
FIG. 12 shows an observed image view illustrating cracks formed in Example 6.
Figure 13:
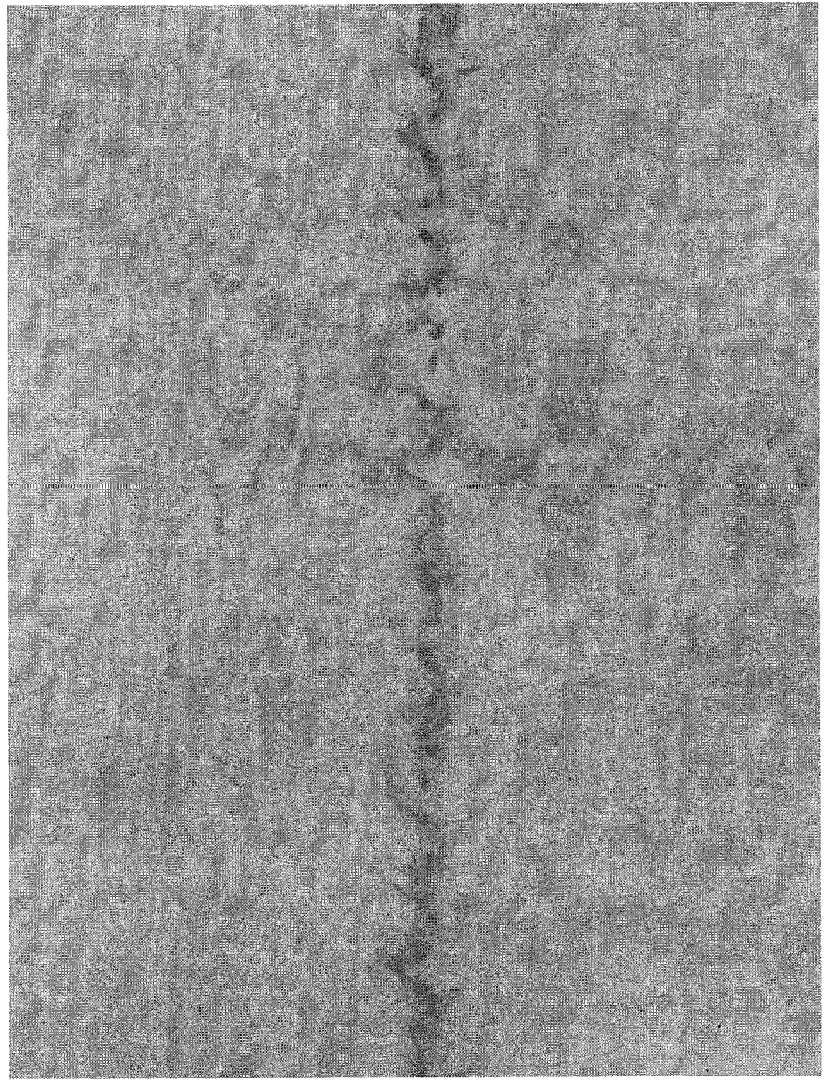
FIG. 13 shows an observed image view illustrating cracks formed in Example 7.
Figure 14:
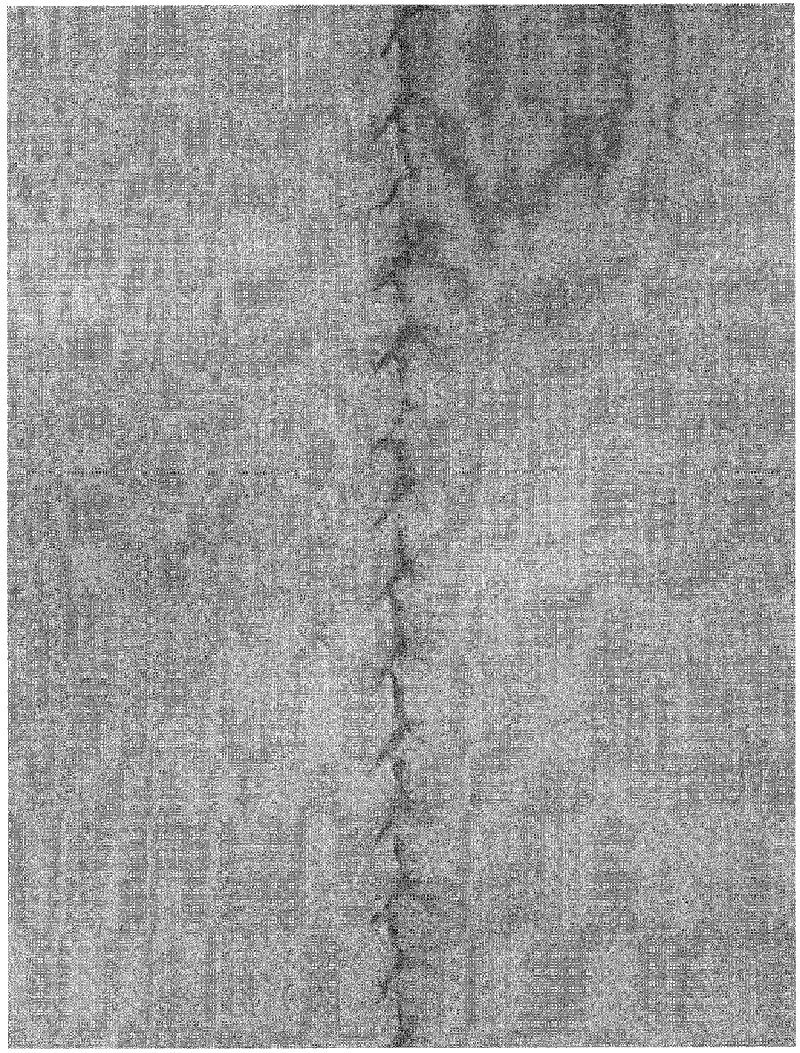
FIG. 14 shows an observed image view illustrating cracks formed in Example 8.
Figure 15:
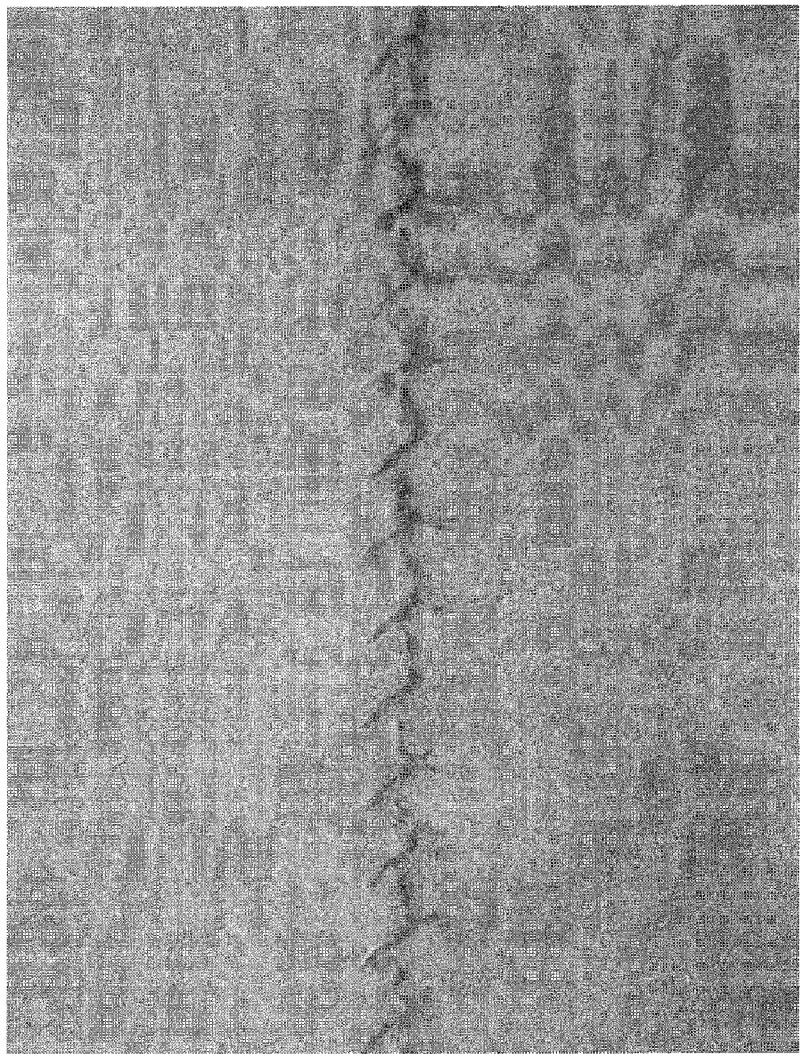
FIG. 15 shows an observed image view illustrating cracks formed in Example 9.

A system configuration example for realizing the laser scribe processing method includes as shown in FIG. 2, a light source 1, a stage 2 and an optical system 3 for irradiation. The light source 1 emits the laser beam P. The stage 2 is provided for mounting the target substance Q of processing, and has a means for allowing the position of the target substance Q of processing with respect to the optical system 3 for irradiation to shift to two orthogonal directions on a face that is perpendicular to the optical axis R of the optical system 3 for irradiation (X axis direction, and Y axis direction).

The optical system 3 for irradiation is provided for guiding and converging the laser beam P emitted from the light source 1 to the target substance Q of processing, and is principally provided with a beam expander 4, a half-wave plate 5, a birefringent prism 6, a light path-correcting optical system 7, a mirror 8, a quarter-wave plate 9 and a light converging lens 10.

The beam expander 4 has a concave lens 11 and a convex lens 12 in the order along the travel direction of the laser beam P, and is for use in expanding the laser beam P emitted from the light source 1. The half-wave plate 5 is disposed backward of the beam expander 4 with respect to the travel direction of the laser beam P and is for use in rotating an electric field vector of the laser beam P, and has a configuration to be rotatable around the optical axis R of the laser beam P. The birefringent prism 6 is provided for splitting the laser beam P emitted from the light source 1 into an ordinary light component 13 and an extraordinary light component 14 having different travel directions. The light path-correcting optical system 7 is provided for correcting the travel direction of the ordinary light component 13 and the extraordinary light component 14 that transmit the birefringent prism 6. The mirror 8 is provided for guiding the laser beam P that transmits the light path-correcting optical system 7 to the light converging lens 10. By changing the reflection angle of the laser beam P using the mirror 8, the travel direction of the laser beam P can be easily adjusted. The quarter-wave plate 9 is disposed backward of the light path-correcting optical system 7 with respect to the travel direction of the laser beam P, and is for use in converting the linear polarization of the laser beam P guided from the mirror 8 into circular polarization. The light converging lens 10 is provided for converging the ordinary light component 13 and the extraordinary light component 14 of the laser beam P that transmitted the quarter-wave plate 9 to the target substance Q of processing.

In the emission step STP1, the laser beam P is emitted from the light source 1. The oscillation means of the laser beam P which may be adopted is for pulse oscillation. When the oscillation means adopted is for pulse oscillation, generation of a laser pulse having a high peak power while concentrating the energy within a short time interval is enabled. As a result, efficient processing on the target substance Q of processing can be achieved with a thermal effect layer at a lower level.

Although mode of oscillation of the pulse oscillation is not particularly limited, for example, pulse oscillation with a pulse width of from about 0.1 ps to 20 ns, Q switch pulse oscillation, and the like may be exemplified. Also, in the Q switch pulse oscillation, an A/O element for high-speed repeating, or an E/O element for short pulse generation may be employed. It should be noted that also in the case of continuous wave oscillation, use of an A/O-Q switch or the like enables the pulse-like oscillation output to be obtained with about several ten KHz repeats.

The wavelength of the laser beam P emitted in the emission step STP1 is preferably adjusted to 200 nm or greater and 11 μm or less when the target substance Q of processing is formed from a hard and brittle material such as sapphire, and adjusting to 240 nm or greater and 1,600 nm or less is particularly preferred. By adjusting the wavelength of the laser beam P to fall within this range, a laser output optimal for cutting the target substance Q of processing formed from a crystalline hard and brittle material can be attained, and efficiency and certainty of the laser scribe processing can be improved.

The type of the light source 1 is not particularly limited, and for example, solid laser such as Nd:YAG laser, Nd:YVO4 laser, Yb: YAG laser and Ti: sapphire laser; fiber laser and higher harmonics thereof; gas laser such as excimer laser and $CO_2$ laser, and the like are exemplified. In particular, short pulse laser accompanied by lower thermal effects, or laser having an oscillation wavelength in ultraviolet region strongly absorbed by a hard and brittle material is preferably employed.

In the splitting step STP2, the laser beam P emitted from the light source 1 is split into the ordinary light component 13 and the extraordinary light component 14 having different travel directions. According to this splitting step STP2, the laser beam P of a single bundle is split into two components of the ordinary light component 13 and the extraordinary light component 14, and the ordinary light component 13 and the extraordinary light component 14 are allowed to travel toward each different directions while splitting their directions in a face that is perpendicular to the optical axis R of the optical system 3 for irradiation. As a result, formation of a pair of beam spots spaced apart with respect to the target substance Q of processing is enabled. A crack formed from thus spaced a pair of beam spots includes a thermal effect layer at a lower level, and continuously extends along a straight line direction that connects the a pair of beam spots. The target substance Q of processing becomes more likely to be cut along the extension direction of the crack, and as a result, uniform and symmetrical cutting is enabled. It is to be noted that providing a single spot without making the beam spots spaced apart is not preferred since a large number of cracks are formed from the central portion of a processing mark of the spot around the peripheral directions on the surface of the target substance Q of processing, thereby making uniform and symmetrical cutting difficult.

For splitting into the ordinary light component 13 and the extraordinary light component 14 in the splitting step STP2, the birefringent prism 6 disposed in the optical system 3 for irradiation may be used. By using such a birefringent prism 6, (1) splitting of the laser beam P into the ordinary light component 13 and the extraordinary light component, and (2) allowing thus split ordinary light component 13 and extraordinary light component 14 to travel toward different directions can be concomitantly realized. As a result, simplification and improvement of operability of the device configuration can be intended.

The birefringent prism 6 has two different refractive indices with respect to crystal orientation, and the difference in these refractive indices can be utilized for splitting the entered laser beam P into the ordinary light component 13 and the extraordinary light component 14. By making the direction of the crystallographic axis S of the birefringent prism orthogonal to the direction of the optical axis R of the optical system 3 for irradiation, and adjusting the angle formed by the direction of the crystallographic axis S with respect to the electric field direction of the laser beam P emitted from the light source 1, the components of the laser beam P can be surely and efficiently split into the ordinary light component 13 and the extraordinary light component 14. In addition, the birefringent prism 6 having a wedge apex angle $\theta_W$ (crossing angle of the light incoming face with respect to the light outgoing face of the prism) allows the ordinary light component 13 and the extraordinary light component 14 to easily travel toward each different directions.

The material of the birefringent prism 6 may include, for example, optical crystalline quartz, sapphire, calcite, and the like, and among all, optical crystalline quartz is preferably used which can exhibit high intensity of light resistance against the laser beam, and can also exhibit high transmittance for a wide wavelength range. Also, the type of the birefringent prism 6 may be, for example, a wedge prism, a Dove prism, a Nicol prism, a Wollaston prism, a Rochon prism, and the like. Of these, a wedge prism is preferred as described above.

In the splitting step STP2, the directions of splitting of the ordinary light component 13 and the extraordinary light component 14 may be adjusted such that the directions of splitting of a pair of beam spots formed in the irradiation step STP4 run along the scribe direction of the target substance Q of processing. The directions of splitting of a pair of beam spots formed in the irradiation step STP4 are determined by the directions of splitting of the ordinary light component 13 and the extraordinary light component 14 split in the splitting step STP2. When the directions of splitting of the ordinary light component 13 and the extraordinary light component 14 are adjusted, and thus the directions of splitting of a pair of beam spots are adjusted so as to meet the scribe direction of the processing target substance, cracks can be effectively extended with respect to the scribe direction, whilst at the same time formation of the cracks that extend along a direction different from the scribe direction can be suppressed. As a result, breakage of the target substance. Q of processing can be executed uniformly and symmetrically. Still further, the extension direction of the cracks can be easily control, whereby extension along the desired direction (scribe direction) is also enabled.

Furthermore, when the target substance Q of processing is a crystalline hard and brittle material such as sapphire, the directions of splitting of the ordinary light component 13 and the extraordinary light component 14 may be adjusted in the splitting step STP2 such that the directions of splitting of a pair of beam spots in the irradiation step STP4 run along the cleavage plane of the target substance Q of processing. The crystalline hard and brittle material has a peculiar cleavage plane that is appropriate for the crystal structure type, and has a property of being easily broken in a direction of the cleavage plane. The directions of splitting of the ordinary light component 13 and the extraordinary light component 14 may be adjusted by using these properties to adjust the directions of splitting of a pair of beam spots such that they run along the cleavage plane of the target substance Q of processing, whereby the crack extends along the cleavage plane, and thus uniform and symmetrical cutting along the extension direction of the crack is enabled. It is to be noted that the crystal structure of the crystalline hard and brittle material that can be processed in the laser scribe processing method includes, for example, those of triclinic, monoclinic, orthorhombic, hexagonal, trigonal, tetragonal and cubic crystal, and the like.

Accordingly, when the directions of splitting of the ordinary light component 13 and the extraordinary light component 14 are adjusted in the splitting step STP2, the birefringent prism 6 that is rotatable around the optical axis R of the optical system 3 for irradiation may be used. By using the birefringent prism 6 that is rotatable around the optical axis R of the optical system 3 for irradiation, the laser beam P can be split into the ordinary light component 13 and the extraordinary light component 14 to allow the light components to travel toward each different directions without making the device configuration complex, and also the directions of splitting of the ordinary light component 13 and the extraordinary light component 14 can be easily adjusted by an easy operation, i.e., rotation of the birefringent prism 6. Referring to a detailed explanation of the mechanism for thus adjusting the direction of splitting, when the birefringent prism 6 is rotated by 45° around the optical axis R of the optical system 3 for irradiation, the directions of splitting of the ordinary light component 13 and the extraordinary light component 14 are similarly rotated by 45° responding to such a rotation, and as a result, the directions of splitting of a pair of beam spots are rotated by 45° in the face that is perpendicular to the optical axis R of the optical system 3 for irradiation. Note that since it is possible to rotate such a birefringent prism 6 by 360° around the optical axis R of the optical system 3 for irradiation, the directions of splitting of a pair of beam spots can be adjusted toward the direction by 360° in the face that is perpendicular to the optical axis R of the optical system 3 for irradiation.

Moreover, when the birefringent prism 6 that is rotatable around the optical axis R of the optical system 3 for irradiation is used, a light path-correcting optical system 7 that is rotatable around the optical axis R of the optical system 3 for irradiation may be provided backward of the birefringent prism 6 with respect to the travel direction of the laser beam P. This light path-correcting optical system 7 is a prism having no birefringency. Also, the apex angle value of the same is determined from the refractive index for the laser beam of the material used, and in general, such an apex angle is different from the apex angle $\theta_W$ of the birefringent prism 6. By using such a light path-correcting optical system 7, displacement of the travel directions of the ordinary light component 13 and the extraordinary light component 14 that may occur due to the rotation of the birefringent prism 6 can be corrected, and as a result, travelling of the ordinary light component 13 and the extraordinary light component 14 toward the desired directions is enabled. It is to be noted that the material of such a light path-correcting optical system 7 may be, for example, synthesized quartz; or the like.

In the splitting step STP2, the directions of splitting of the ordinary light component 13 and the extraordinary light component 14 may be adjusted such that the distance between centers of the a pair of beam spots be adjusted in the irradiation step STP4. In order to form a pair of beam spots on the target substance Q of processing, and to allow a crack to extend along the desired direction while efficiently generating the crack formed on a straight line that connects the a pair of beam spots, it is necessary to adjust the distance between centers of the a pair of beam spots to an optimal value that is appropriate for the type and properties of the target substance Q of processing, processing characteristics, and the like. Therefore, by adjusting the directions of splitting of the ordinary light component 13 and the extraordinary light component 14 of the laser beam P that were split, the distance between centers of the a pair of beam spots is also adjusted responding to such an adjustment. As a result, formation and extension of the most suitable crack that is appropriate for the type and properties of the target substance Q of processing, processing characteristics, and the like can be effectively realized, and the formation and extension of such a crack can be easily controlled.

As means for adjusting the distance between centers of the a pair of beam spots, for example, a means of adjusting the wedge apex angle $\theta_W$ of the birefringent prism 6, a means for expanding the laser beam diameter using a lens optical system (not shown in the Figure), and the like may be involved. Referring to a detailed explanation of the means of adjusting the wedge apex angle $\theta_W$ of the birefringent prism 6, for example, provided that: the wavelength of the laser beam P is set to be 1.064 μm; the focal length of the light converging lens is set to be 100 mm; and the wedge apex angle $\theta_W$ is set to be about 2°, the distance between centers of the a pair of beam spots will be about 60 μm. Accordingly, by providing multiple birefringent prisms having different wedge apex angles $\theta_W$, adjustment of the distance between centers of the a pair of beam spots that is the most appropriate for properties of the target substance Q of processing and the like is enabled.

Also, in connection with a detailed explanation of the means for expanding the laser beam diameter using a lens optical system, the distance between centers of the a pair of beam spots can be adjusted by, for example, expanding the laser beam P using a lens optical system having a concave lens and a convex lens in the order along the travel direction of the laser beam P. It is to be noted that by providing such a mechanism of expanding the laser beam diameter of the lens optical system as a continuous system, continuous adjustment of the distance between centers is enabled.

The distance between centers of the a pair of beam spots is preferably adjusted to 0.2 times or greater and 50 times or less, and particularly preferably 0.5 times or greater and 40 times or less the spot diameter. When the distance between centers of the a pair of beam spots falls within this range, requirements for the beam spots can be provided that are the most appropriate for forming and extending a straight and stable crack along the cutting direction of the target substance Q of processing. The distance between centers of less than 0.2 times the spot diameter is not preferred since almost similarly to the case of a single spot, a large number of beam spots are formed around the periphery of the surface of the target substance Q of processing, thereby leading to difficulty in realizing uniform and symmetrical cutting. Also, the distance between centers exceeding 50 times the spot diameter is not preferred since cracks that extend from each beam spots of the group of a pair of beam spots intermittently formed cannot be linked, and as a result, cutting of the target substance Q of processing may be difficult.

In the splitting step STP2, the intensity ratio of the ordinary light component 13 to the extraordinary light component 14 may be adjusted using a half-wave plate 5 which is disposed on the optical system 3 for irradiation and is rotatable around the optical axis R of the optical system 3 for irradiation. This intensity ratio of the ordinary light component 13 to the extraordinary light component 14 serves in optimizing the length and the direction of the crack formed by a pair of beam spots. Therefore, by adjusting the intensity ratio of the ordinary light component 13 to the extraordinary light component 14 using a polarization rotation element such as the half-wave plate 5, the power density of the a pair of beam spots can be controlled, and thus generation of a thermal effect layer and the extension direction of the crack that are the most appropriate for the type and properties of the target substance Q of processing can be easily adjusted. In connection with the mechanism explained in detail, the half-wave plate 5 serves in rotating an electric field vector of the laser beam P before being split. For example, provided that the angle formed with the electric field vector of the incoming laser beam and a slow axis of the half-wave plate 5 is defined as θ, transmission of the laser beam P through the half-wave plate 5 results in rotation by 2θ of the electric field vector following the transmission. By using such a half-wave plate 5, the intensity ratio of the split ordinary light component 13 to extraordinary light component 14 can be easily adjusted without making the device configuration complex. Furthermore, by making the half-wave plate 5 rotatable around the optical axis R of the laser beam P, the intensity ratio of the ordinary light component 13 that is perpendicular to the slow axis to the extraordinary light component 14 that is orthogonal thereto can be easily and continuously altered depending on the rotation angle.

In the light converging step STP3, a pair of beam spots are formed while converging the ordinary light component 13 and the extraordinary light component 14 which were split in the splitting step STP2, and each have different travel directions. Although such a light converging means is not particularly limited, preferably employed is a light converging lens 10 that is a combined lens or a simple lens having optical aberration corrected for the wavelength of the laser beam P used. It is to be noted that the type of the lens that configures the light converging lens 10 may include, for example, a biconvex lens, a plano-convex lens, a convex meniscus lens, a biconcave lens, a plano-concave lens, a concave meniscus lens, and the like.

In the irradiation step STP4, the laser beam P having a pair of beam spots formed in the light converging step STP3 is intermittently irradiated in a scribe direction of the target substance Q of processing. By thus intermittently irradiating with a pair of beam spots in the scribe direction, cracks that extend on the straight line that connects the a pair of beam spots are linked, and as a result, the target substance Q of processing can be uniformly and symmetrically cut while minimizing the influences from the thermal stress. It is to be noted that in the irradiation step STP4, by adjusting the pulse width of the intermittent irradiation with the laser beam P, linking of the crack formed by the first pulse oscillation and the crack formed by the second pulse oscillation can be also adjusted and controlled.

The spot diameter of the a pair of beam spots formed in the irradiation step STP4 is preferably 0.3 μm or greater and 300 μm or less, and adjusting the spot diameter to 0.5 μm or greater and 200 μm or less is particularly preferred. When the spot diameter falls within this range, the crack formed on the straight line that connects the a pair of beam spots can be even more greatly extended. This spot diameter being greater than 200 μm is not preferred since deformation of the target substance Q of processing may occur as thermal stress is generated in a wide area on the surface of the target substance Q of processing.

The optical system 3 for irradiation may be further provided with a quarter-wave plate 9. By using the quarter-wave plate 9, the linear polarization of the laser beam P is converted into circular polarization to eliminate the influences from polarization, whereby stabilization of processing characteristics may be achieved. It is to be noted that by setting the slow axis (not shown in the Figure) of the quarter-wave plate 9 to form angles of each 45° with respect to the polarization orientations of the ordinary light component 13 and the extraordinary light component 14, conversion into the circular polarization can be more certainly realized.

The laser processing method of the present invention is not limited to the foregoing embodiments. For example, in the case in which to distinguish polarization orientations of multiple pairs of beam spots is envisaged to be efficacious depending on properties of the processing target substance, the quarter-wave plate may not be disposed in the optical system for irradiation. In addition, when the beam diameter of the laser beam emitted from the light source is greater than the incident pupil diameter of the light converging lens, the optical system for irradiation may not be provided with a beam expander.

Furthermore, formation of 4 or more beam spots is also enabled in the optical system for irradiation by disposing on the optical axis of the optical system for irradiation a plurality of (1) half-wave plates, (2) birefringent prisms and (3) beam splitting units, with one unit being constructed with a light path-correcting optical system. For example, when the number of the beam units disposed is two (a first unit and a second unit, in the order along the laser-beam travel direction), as a consequence of setting of the rotation angle of the half-wave plate of the second unit to be 22.5°, the extraordinary light component and the ordinary light component split in the first unit are inclined by 45 degrees each with respect to the crystallographic axis of the second unit, and each beam components are further split into the extraordinary light component and the ordinary light component. As a result, the laser beam transmitted through the second unit is split into four beam spots.

EXAMPLES

Hereinafter, the present invention is explained in detail by way of Examples, but the present invention should not be construed as being limited to these Examples.

Experiment 1

Examples 1 to 3

Explanation of Experimental System

Using a light source, a stage, and an optical system for irradiation provided with at least a half-wave plate, a birefringent prism and a light converging lens, a borosilicate glass (noncrystalline hard and brittle material) as a processing target substance was irradiated with a pair of beam spots to form cracks. Thereafter, an observed image view showing the state of thus formed cracks was photographed.

In Experiment 1, Nd:YAG (THG) laser was employed as a light source, and a quartz wedge plate was employed as a birefringent prism. Additionally, the apex angle of the quartz wedge plate, and the focal length of the light converging lens were selected such that the distance between centers of the a pair of beam spots became from 3 μm to 4 μm. The length of the crack formed by spot irradiation with the laser beam is closely related to fracture strength of the cleavage plane of the hard and brittle material, and characteristics of the beam spot (for example, wavelength, power, pulse width, spot diameter, etc.); however, in order to efficiently produce the crack along a predetermined direction, it is preferred to set the distance between centers of the a pair of beam spots to be about from 0.5 times to 40 times the diameter of the converged spot of the laser beam. Accordingly, in Experiment 1, the shifting speed of a XY stage that allows a hard and brittle material board to relatively shift with respect to the beam spots (relative shifting in X axis direction and Y axis direction), and a Q switch pulse rate were selected to achieve the setting of an interval between processing marks of 15 μm. It should be noted that in connection with the power density at the light converging point, the laser power, the light converging lens and the like were selected such that the spot diameter became 2.2 μmϕ, and the power density per shot became $2.3 \times 10^{10}$ W/cm$^2$ for each beam spot.

In Example 1, the processing was carried out with the quartz wedge plate rotated by 45° around the optical axis of the optical system for irradiation, such that the setting provides a pair of beam spots to form an angle of 45° with respect to the scribe direction on the XY plane of the processing target substance. In Example 2, the processing was carried out with the quartz wedge plate rotated by 45° in a direction opposite to the rotation direction in Example 1. In Example 3, the processing was carried out with the directions of splitting of a pair of beam spots to be parallel to the scribe direction on the XY plane of the processing target substance.

Experiment 2

Comparative Examples 1 to 3

Explanation of Experimental System

Similarly to a well-known laser processing method, cracks were formed using a light source (THG laser), a stage and an optical system for irradiation, by irradiating with one beam spot a borosilicate glass employed as a processing target substance. Thereafter, observed image views of the state of formed cracks were photographed.

In Comparative Example 1, the beam spot diameter was set to be 2.2 µmφ similarly to Experiment 1. In addition, taking into consideration a single spot to be provided, the processing was carries out with the power density set to be $3.9 \times 10^{10}$ W/cm$^2$ that was about twice the value in Experiment 1, and the distance between centers of the a pair of beam spots set to be 15 µm. Comparative Example 2 shows results of verification as to whether generation of cracks concentrates to the scribe direction similarly to the case of the processing with two spots, when the distance between centers of respective irradiated spots is reduced in the case of the processing with a single spot. In this Comparative Example 2, the Q switch pulse rate was set to be the same as that in Experiment 1, and the shifting speed of the stage was set to about half the shifting speed in Experiment 1 to carryout the processing. In Comparative Example 3, the power density was set to be $2.3 \times 10^{10}$ W/cm$^2$, which was an almost the same value as the power density of one spot in the processing with two spots to carry out the processing.

<Evaluation of Characteristics in Experiments 1 and 2>

Results of Experiments 1 and 2 are shown in from FIG. 3 to FIG. 8.

Example 1 and Example 2 revealed that when the quartz wedge plate was rotated around the optical axis of the optical system for irradiation by 90° (45°±45°), the direction of formation of the crack generated between a pair of beam spots changed by 90 degrees. In Example 3, it was revealed that the direction of formation of the crack generated between a pair of beam spots agreed with the scribe direction, and thus formation of the crack that extended along a different direction from the scribe direction was suppressed.

In Comparative Example 1, it was reveled that cracks formed from the central portion of processing mark of each beam spot were formed in a large number not only along the scribe direction but also around the peripheral direction of the processing mark. In Comparative Example 2, it was revealed that the interval between processing marks was 7.5 µm, and cracks formed from the central portion of processing mark of each beam spot were formed in a large number not only along the scribe direction but also around the peripheral direction of the processing mark. Although formation of the crack around the peripheral direction of the processing mark was suppressed in Comparative Example 3, the scribing speed was half the speed in Examples, suggesting decrease in the throughput.

From these results, the extension direction of cracks formed between a pair of beam spots can be controlled according to the laser processing method of the present invention, and as a result, it is believed that scribe processing can be achieved while suppressing generation of the crack around the periphery of the scribe groove, without lowering the processing speed.

Experiment 3

Comparative Example 4

Explanation of Experimental System

Similarly to a well-known laser processing method, cracks were formed using a light source (THG laser), a stage and an optical system for irradiation, by irradiating with one beam spot onto a sapphire board having a C face as a main face. Thereafter, an observed image view of the state of formed cracks was photographed. The spot diameter in Experiment 3 was set to be 1.1 µmφ, and the power density was set to be $13 \times 10^{10}$ W/cm$^2$.

Experiment 4

Examples 4 to 9

Explanation of Experimental System

The experimental system was similar to that in Experiment 1 except that the processing target substance was a sapphire board having a C face as a main face. The apex angle, and the focal length of the light converging lens of the quartz wedge plate were selected such that: each beam spot diameter became 1.1 µmφ; the power density of each beam spot became $4.6 \times 10^{10}$ W/cm$^2$; and the distance between centers of the a pair of beam spots became about 3 µm. It should be noted that the interval of the irradiated spots was set to be 15 µm by adjusting the Q switch pulse rate and the shifting speed of the stage.

In Example 4, the processing was carried out with the scribe direction to be parallel to the orientation flat. In Example 5, the processing was carried out with the scribe direction to be a direction orthogonal to the orientation flat. In Example 6 and Example 7, the quartz wedge plate was rotated around the optical axis of the optical system for irradiation by 45° such that the setting provides directions of splitting of a pair of beam spots to form an angle of 45° with respect to the scribe direction on the XY plane of the processing target substance, and the processing was carried out with the scribe direction to be parallel to the orientation flat in Example 6, whereas the processing was carried out with the scribe direction to be a direction orthogonal to the orientation flat in Example 7. In Example 8 and Example 9, the quartz wedge plate was rotated by 45° in a direction opposite to the rotation direction in Example 6 and Example 7 such that the setting provides a pair of beam spots to form an angle of 45° with respect to the scribe direction on the XY plane of the processing target substance, and the processing was carried out with the scribe direction to be parallel to the orientation flat in Example 8, whereas the processing was carried out with the scribe direction to be a direction orthogonal to the orientation flat in Example 9.

<Evaluation of Characteristics in Experiments 3 and 4>

In Comparative Example 4, cracks were formed along three directions from the irradiated spot; however, the state of generation of the crack for each shot was observed to involve irregularity, and the crack was formed ununiformly. In addition, failure in linking of the cracks between each processing marks also occurred in some cases.

In Example 4, regular linking of cracks was found. In Example 5, regular linking of cracks was found similarly to Example 4. In Example 6 and Example 7, cracks in a direction of 45° along which the beam spots were aligned were found to be significantly extended. In Example 8 and Example 9, it was found that the direction of a maximum crack rotated by 90° with respect to those in Example 6 and Example 7.

From the results described above, it was proven that the cleavage direction can be easily adjusted and/or controlled also in the case of crystalline hard and brittle materials. By executing such adjustment and/or control, the direction of cleavage generated by laser irradiation is controlled, leading to growth of a cleavage approximate to a scribe direction of a board of sapphire, etc. Accordingly, it is believed that formation of a desired scribe groove can be attained.

As described in the foregoing, processing can be carried out with less laser power, whereby energy saving is realized according to the laser scribe processing method of the present invention since cutting of a processing target substance is executed by irradiating a processing target substance with a laser beam having multiple pairs of beam spots, and allowing cracks formed with the multiple pairs of beam spots to extend in a direction along which the processing target substance is likely to be broken. In addition, since influences from the thermal stress is minimize, deformation and the like of the processing target substance can be effectively prevented, and thus the throughput can be improved. Moreover, since the laser scribe processing method of the present invention includes simple and convenient steps; therefore, cost reduction and improvement of operation efficiency can be achieved.

EXPLANATION OF THE REFERENCE SYMBOLS

1: light source
2: stage
3: optical system for irradiation
4: beam expander
5: half-wave plate
6: birefringent prism
7: light path-correcting optical system
8: mirror
9: quarter-wave plate
10: light converging lens
11: concave lens
12: convex lens
13: ordinary light component
14: extraordinary light component
P: laser beam
Q: processing target substance
R: the optical axis of the optical system for irradiation
S: crystallographic axis
STP1: emission step
STP2: splitting step
STP3: light converging step
STP4: irradiation step

The invention claimed is:

1. A laser scribe processing method performed using a light source that emits a laser beam, and an optical system for irradiation that leads the laser beam onto a processing target substance, the method comprising:
   an emission step of emitting the laser beam from the light source;
   a splitting step of splitting the laser beam into an ordinary light component and an extraordinary light component having different travel directions;
   a light converging step of converging the ordinary light component and the extraordinary light component to form one or multiple pairs of beam spots; and
   an irradiation step of intermittently irradiating with the laser beam having one or multiple pairs of beam spots in a scribe direction of the processing target substance to form one or more cracks along a straight line that connects paired beam spots.

2. The laser scribe processing method according to claim 1, wherein a birefringent prism disposed in the optical system for irradiation is used for splitting into the ordinary light component and the extraordinary light component in the splitting step.

3. The laser scribe processing method according to claim 1, wherein a direction of splitting of the laser beam into the ordinary light component and the extraordinary light component is adjusted such that a direction of splitting of the laser beam into the one or multiple pairs of beam spots in the irradiation step runs along the scribe direction of the processing target substance.

4. The laser scribe processing method according to claim 1, wherein a direction of splitting of the laser beam into the ordinary light component and the extraordinary light component is adjusted such that a direction of splitting of the laser beam into the one or multiple pairs of beam spots in the irradiation step runs along a cleavage plane of the processing target substance.

5. The laser scribe processing method according to claim 3, wherein a birefringent prism which is disposed in the optical system for irradiation, and is rotatable around the optical axis of the optical system for irradiation is used for adjusting the direction of splitting of the laser beam into the one or multiple pairs of beam spots in the irradiation step.

6. The laser scribe processing method according to claim 1, wherein a direction of splitting of the laser beam into the ordinary light component and the extraordinary light component is adjusted such that the distance between centers of the one or multiple pairs of beam spots in the irradiation step is adjusted.

7. The laser scribe processing method according to claim 6, wherein the distance between centers of the one or multiple pairs of beam spots in the irradiation step is adjusted to 0.2 times or greater and 50 times or less of the spot diameter.

8. The laser scribe processing method according to claim 1, wherein in the splitting step, a half-wave plate which is disposed in the optical system for irradiation and is rotatable around the optical axis of the optical system for irradiation is used to adjust the intensity ratio of the ordinary light component to the extraordinary light component.

9. The laser scribe processing method according to claim 1, wherein the one or multiple pairs of beam spots formed in the irradiation step have a spot diameter of 0.3 μm or greater and 300 μm or less.

10. The laser scribe processing method according to claim 1, wherein the optical system for irradiation further comprises a quarter-wave plate.

11. The laser scribe processing method according to claim 4, wherein a birefringent prism which is disposed in the optical system for irradiation, and is rotatable around the optical axis of the optical system for irradiation is used for adjusting the direction of splitting of the laser beam into the one or multiple pairs of beam spots in the irradiation step.

* * * * *